United States Patent
Calkins

(10) Patent No.: US 11,582,532 B2
(45) Date of Patent: *Feb. 14, 2023

(54) AUDIO IMPROVEMENT USING CLOSED CAPTION DATA

(71) Applicant: Comcast Cable Communications, LLC, Philadelphia, PA (US)

(72) Inventor: Jeff Calkins, Evergreen, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/200,262

(22) Filed: Mar. 12, 2021

(65) Prior Publication Data

US 2021/0345010 A1 Nov. 4, 2021

Related U.S. Application Data

(63) Continuation of application No. 16/415,730, filed on May 17, 2019, now Pat. No. 10,986,418.

(51) Int. Cl.
| | |
|---|---|
| *H04N 21/81* | (2011.01) |
| *G10L 21/0364* | (2013.01) |
| *G10L 21/10* | (2013.01) |
| *H04N 21/439* | (2011.01) |
| *H04N 21/45* | (2011.01) |

(Continued)

(52) U.S. Cl.
CPC ..... *H04N 21/8106* (2013.01); *G10L 21/0364* (2013.01); *G10L 21/10* (2013.01); *H04N 21/4394* (2013.01); *H04N 21/4532* (2013.01); *H04N 21/4884* (2013.01); *G10L 2021/065* (2013.01)

(58) Field of Classification Search
CPC .......... H04N 21/8106; H04N 21/4394; H04N 21/4532; H04N 21/4884; G10L 21/0364; G10L 21/10; G10L 2021/065
See application file for complete search history.

(56) References Cited

U.S. PATENT DOCUMENTS

| | | | |
|---|---|---|---|
| 5,388,992 A | 2/1995 | Franklin et al. | |
| 8,565,458 B2 | 10/2013 | Eisenberg et al. | |
| 9,998,794 B1* | 6/2018 | Newell | H04N 21/8133 |

(Continued)

FOREIGN PATENT DOCUMENTS

WO 2012/012074 A1 1/2012

OTHER PUBLICATIONS

US Patent Application filed on May 17, 2019, entitled "Audio Improvement Using Closed Caption Data", U.S. Appl. No. 16/415,730.

*Primary Examiner* — Sumaiya A Chowdhury
(74) *Attorney, Agent, or Firm* — BakerHostetler

(57) ABSTRACT

Methods and systems are described herein for improving audio for hearing impaired content consumers. An example method may comprise determining a content asset. Closed caption data associated with the content asset may be determined. At least a portion of the closed caption data may be determined based on a user setting associated with a hearing impairment. Compensating audio comprising a frequency translation associated with at least the portion of the closed caption data may be generated. The content asset may be caused to be output with audio content comprising the compensating audio and the original audio.

24 Claims, 7 Drawing Sheets

(51) Int. Cl.
*H04N 21/488* (2011.01)
*G10L 21/06* (2013.01)

(56) References Cited

U.S. PATENT DOCUMENTS

| | | |
|---|---|---|
| 2005/0086058 A1* | 4/2005 | Lemelson ............... H04R 5/04 |
| | | 704/270 |
| 2008/0040116 A1 | 2/2008 | Cronin et al. |
| 2011/0237295 A1 | 9/2011 | Bartkowiak et al. |
| 2012/0005701 A1 | 1/2012 | Quan |
| 2014/0331265 A1 | 11/2014 | Mozell et al. |
| 2015/0120293 A1* | 4/2015 | Wohlert ............... G09B 21/006 |
| | | 704/235 |
| 2017/0186431 A1 | 6/2017 | Didik |

\* cited by examiner

AUDIO IMPROVEMENT USING CLOSED CAPTION DATA

CROSS-REFERENCE TO RELATED APPLICATION

This application is a continuation of U.S. patent application Ser. No. 16/415,730 filed May 17, 2019, which is incorporated herein by reference in its entirety for any and all purposes.

BACKGROUND

Hearing loss and disabilities may cause some people to not recognize or hear a sound (e.g., speech, consonant, affricate, etc.) in a certain frequency range. A conventional hearing aid for compensating for hearing loss may transpose sounds into a frequency range a wearer of the hearing aid may recognize. These hearing aids, however, transpose all noise in the hearing loss range indiscriminately. This results in sound being distorted by the hearing aid unnecessarily, including sounds that the wearer of the hearing aid may recognize without the use of a hearing aid. Thus, there is a need for more sophisticated audio correction for people with hearing loss.

SUMMARY

Systems and methods are described herein for improving audio for hearing impaired consumers of audio content, and particularly audiovisual content. A user may have a hearing profile associated with a content service. The hearing profile may indicate problematic frequencies, words, sounds, characters, and/or the like that the user may be unable to hear and/or have a difficult time hearing. If a user requests a content asset, such as a show, a computing device receiving the request may determine that the user may have a hearing impairment. One or more rules may be applied to modify audio so that the user is better able to understand the audio. Closed caption data may be used to determine any problematic words, sounds, characters, frequencies, and/or the like that may occur in the requested content asset. Problematic words, sounds, characters, frequencies, and/or the like in the closed caption data may be correlated to portions of the original audio. The original audio may be modified (e.g., higher frequencies may be changed to lower frequencies) and/or provided with compensating audio to allow the user to better recognize the problematic audio.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
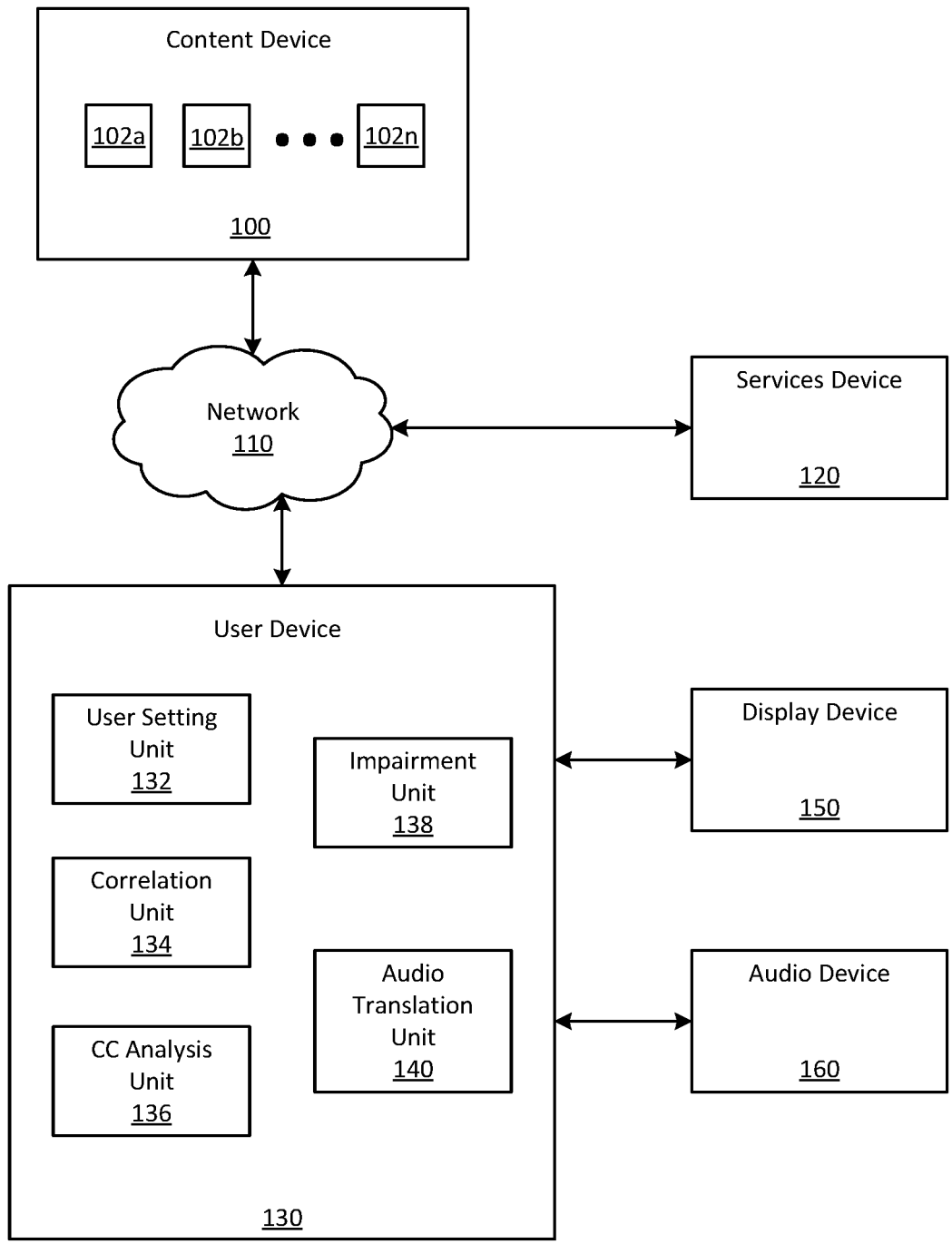
FIG. 1 is a block diagram showing an example operating environment.

Methods and systems are disclosed for customizing content are disclosed. A computing device, such as a set-top box, may receive data related to a content asset from a content network. The computing device may prepare the received data related to the content asset for audio and/or video presentation. The received data may comprise closed caption (CC) data. The computing device may analyze the CC data prior to presentation of associated audio data. Analyzing the CC data may comprise determining if a user may have recognition issues with a word. A user setting associated with hearing loss may be accessed. If the computing device determines that the user may have recognition issues with a particular word, the computing device may retrieve a compensation fix (e.g., a binary compensation sound, etc.) associated with the particular word. The computing device may add the compensation fix to a portion of the audio data associated with the particular word and present audio with a combination of the audio data and the compensation fix. When no recognition issue is detected, the computing device may present the audio data as normal.

If a computing device is in an analog mode and the computing device detects a user may have recognition issues with a particular word, then the computing device may amplify frequencies related to the particular word. The amplification of the frequencies may be in accordance with a hearing aid prescription from an audiologist. If a computing device detects a user may have recognition issues with a particular word, then the computing device may augment video data associated with the particular word. The computing device may cause light flashes on a screen when the particular word is presented. The computing device may cause the particular word to be displayed on the screen.

A computing device may take corrective action in response to detecting a user may have recognition issues with a particular word. Corrective action may comprise frequency transposition. Corrective action may comprise combining (e.g., mixing, adding, etc.) an audio signal associated with the particular word with a second signal associated with corrective audio data associated with the particular word. Corrective action may comprise performing a transformation on an audio signal associated with the particular word. Corrective action may comprise shifting a frequency of an audio signal associated with the particular word.

A user may request a program (e.g., show, movie, etc.) via a computing device. The computing device may comprise a user profile associated with the user. The user profile may indicate that the user has high frequency hearing loss. The computing device may extract closed caption (CC) data associated with the program and analyze the CC data before associated audio data is presented. The computing device may identify problem words in the CC data. A compensating audio sound may be generated for identified problem words. The compensating audio sound may comprise a lower frequency than an associated identified problem word. The computing device may correlate the compensating audio sound with a position in audio data associated with the associated identified word. The computing device may cause the correlated compensating audio sound and audio data to be presented to the user. Correlating the compensating audio sound with the audio data may happen in real-time or near real-time.

A server associated with a content delivery network may correlate the compensating audio sound with the audio data in advance of a request for content and store the correlated audio. The server may receive an indication that a user comprising high frequency hearing loss requested a particular content asset, and the server may transmit stored correlated audio associated with the particular content asset to a user device (e.g., mobile phone, set-top box, tablet, cable modem, gateway, desktop, etc.) associated with the user.

Compensating audio and original audio may be outputted together as two separate audio signals. Outputting the compensating audio and the original audio as two separate audio signals may comprise outputting the two separate audio signals from a same speaker. Outputting the compensating audio and the original audio as two separate audio signals may comprise outputting the compensating audio from one speaker and the original audio from another speaker. The compensating audio may be outputted from a hearing aid or a headphone, while the original audio may be outputted from a speaker associated with a television.

Original audio may be modified to generate a single audio file to deliver to a speaker. The speaker may be a speaker intended for multiple users, such as a sound bar or a speaker associated with a television. The speaker may be a speaker intended for a single user, such as a hearing aid or a set of headphones.

In response to detecting a problem word, a visual indicator may be caused to be displayed. The visual indicator may be caused to be displayed at a same time as compensated audio is outputted. The visual indicator may comprise a flashing light. The visual indicator may comprise the problem word.

Problem sounds may be identified as well. Problem sounds may comprise high pitched sounds, such as birds chirping, etc. Corrective action may be taken for identified problem sounds. Corrective action for problem sounds may comprise any of the corrective action for problem words previously discussed.

FIG. 1 is a block diagram showing an example operating environment. The example operating environment may comprise one or more of a content device 100, a network 110, a services device 120, a user device 130, a display device 150, and/or an audio device 160.

The content device 100 may comprise one or more content assets 102a,b,n. Each of the one or more content assets 102a,b,n may comprise video data, audio data, closed caption (CC) data, a combination thereof, and/or the like. The content device 100 may be in communication with a network 110. The content device 100 may comprise one or more servers. The content device 100 may be one or more edge devices of a content distribution network and/or content access network.

The network 110 may comprise a private portion. The network 110 may comprise a public portion. The network 110 may comprise a content distribution and/or access network. The network 110 may facilitate communication via one or more communication protocols. The network 110 may comprise fiber, cable, a combination thereof. The network 110 may comprise wired links, wireless links, a combination thereof, and/or the like. The network 110 may comprise routers, switches, nodes, gateways, servers, modems, and/or the like.

The services device 120 may be in communication with the network 110. The services device 120 may comprise one or more servers. The services device 120 may comprise and/or provide a content related service (e.g., an application, an application program interface, storage service). The services device 120 may be configured to store user data, such as user settings, a user profile, and/or the like. The user data may comprise a hearing profile. A user (e.g., subscriber of a content service) may update a hearing profile associated with the user via the services device 120. The hearing profile may comprise impairment rules, hearing loss frequencies (e.g., or range), problem words (e.g., words difficult to hear or which a user is unable to hear), problem sounds (e.g., sounds difficult to hear or which a user is unable to hear). The impairment rules may associate compensation information with problem sounds, frequencies, and/or words. The compensation information may comprise a process to perform, such as applying a filter, performing a frequency translation, replacing a word, modifying a word, replacing a sound, modifying a sound, displaying a notification, and/or the like. The compensation information may comprise one or more input parameters for the process to perform, such as an amount of frequency translation to apply. The services device 120 may send the user data to the user device 130 via the network 110.

The user device 130 may comprise one or more of a user setting unit 132, a correlation unit 134, a closed caption (CC) analysis unit 136, an impairment unit 138, an audio translation unit 140, and/or the like. The user device 130 may comprise and/or be in communication with the display device 150. The user device 130 may comprise and/or be in communication with the audio device 160. The user device 130 may comprise a set-top box, digital streaming device, a cable modem, a gateway device, a television, a smart phone, a tablet, a wearable device, a laptop, a computing device, the like, and/or any combination of the foregoing. The display device 150 may comprise one or more display screens. The display device 150 may comprise a light emitting device. The display device 150 may comprise a speaker, such as a speaker integrated into a housing of the display device 150. The audio device 160 may comprise one or more speakers. The audio device 160 may comprise a hearing aid. The audio device 160 may comprise a set of headphones.

The user setting unit 132 may comprise settings associated with one or more users associated with the user device 130. The settings may comprise hearing impairment information. The settings may comprise the user data, such as a hearing impairment profile. The settings may comprise demographic information. The user device 130 may use the user setting unit 132 to determine any portions of problematic content. The problematic content may comprise any content that a user may be unable to hear or have a difficult time hearing. The setting may indicate that a user has hearing loss associated with one or more frequencies, one or more words, one or more characters, and/or the like. The user setting may be used to determine one or more words, one or more characters, and/or the like. One or more lists of problematic words (e.g., or characters) associated with corresponding different hearing loss problems (e.g., or frequencies) may be stored. The list of problematic words and/or problematic characters may be determined (e.g., or accessed) based on the setting. The user setting unit 132 may comprise one or more programming and/or software modules. The user setting unit 132 may comprise a portion of a programming and/or software module.

The correlation unit 134 may determine a time (e.g., associated with the original audio of a content item) associated with a problem word and/or sound in audio data. The correlation unit 134 may comprise one or more programming and/or software modules. The correlation unit 134 may comprise a portion of a programming and/or software module. The correlation unit 134 may determine a time associated with the audio data in which corrective action for the problem word and/or sound should be taken. A problematic word in the original audio may comprise one or more problematic syllables (e.g., one or more of which may be compensated). A word may have an associated a start time (t0), an end time (tn), and a duration of tn–t0 (seconds). The correlation unit 134 be configured to divide a single word into syllable sections, providing a start and stop time for each syllable. The correlation unit 134 be configured to use an interpolation algorithm to determine one or more syllable sections (e.g., or other character set) based on a word (e.g., divide a single word into syllable sections). A start time and/or a stop time may be identified for each syllable. The interpolation algorithm may be configured to determine the start time and/or stop time based on an estimated speech cadence (e.g., or other metric for speed of speech).

A sample of audio of a content item may be used to determine an estimated speed of the speech. A word may have an expected time in between a first section (e.g., first syllable section) and a second section (e.g., second syllable section). The expected time may be adjusted based on the determined speed and/or cadence estimate. The expected time may be used to determine the end of the first section, beginning of the second section, end of the second section, beginning of a third section. As an example, the term "icecream" (assuming it is only one word) may be broken into "ice" and "cream." The "cr" sound may be identified as a problematic word. The interpolation algorithm may determine (e.g., based on an expected start time, end time, and/or duration of "ice") a beginning time of the "cr" sound and/or an end time of the "cr" sound.

The interpolation algorithm may further cause the correlation unit 134 to refine the start time, end time and/or duration based on other information. The portion of the original audio expected to contain a word may be analyzed to determine a time when the audio goes above a threshold frequency. This time associated with going above the threshold frequency may be used to determine the start time, end time, duration and/or the like of a word, syllable, character set, and/or the like. Similar analysis may also be used to determine the start, duration, and/or end of an entire word. An expected pause time between words may be used to determine a start time of a word following a prior word. The expected pause time may be adjusted based on a determined speed, frequency analysis, and/or the like.

In some implementations, the function of the correlation unit may be performed by another device. The content device 100 may send data indicating the start times, end times, duration, and/or the like of expected problem words, syllables, character sets, and/or the like. The data may be sent as metadata of an associated content stream. The data may be sent as separate data (e.g., a file).

The CC analysis unit 136 may analyze CC data to determine if the CC data comprises problematic words, sounds, syllables, and/or character sets. The CC analysis unit 136 may comprise one or more programming and/or software modules. The CC analysis unit 136 may comprise a portion of a programming and/or software module. The CC analysis unit 136 may determine (e.g., or access) a list (e.g., or dictionary, group) of problematic words, sounds, syllables, and/or character sets. The term access as used herein should be understood to mean accessing locally, accessing at another device and/or source, a combination thereof, and/or the like. The CC analysis unit 136 may access the CC data. The CC data may be accessed from a server. The CC data may be accessed from received content data (e.g., such as a field of the content data, or position within a video frame).

The CC analysis unit 136 may analyze increments of the CC data. The CC data may be received as segments (e.g., increments) from the content device 100. A new segment of CC data may correspond to a video frame, such as an intra-coded picture frame (I-frame). The CC data may comprise ascii metadata. The CC data may be transmitted in a transport stream (e.g., MPEG transport stream) in segments. The CC analysis unit 136 may read the entire segment before the segment is output to the user. The user device 130 may also identify problematic words in the CC data and/or determine (e.g., or access) compensating audio before the segment is output to the user. The user device 130 may buffer (e.g., delay output) of the content item to allow time to determine (e.g., or access) the appropriate audio.

The CC analysis unit 136 may determine problematic words, syllables, character sets, and/or the like before the segment is output to the user. The CC analysis unit 136 may use the impairment unit 138 to determine whether any of the words, syllables, character sets, and/or the like of a closed caption segment are problematic for users with hearing impairment. The impairment unit 138 may use lists, dictionaries, rules, and/or the like to determine whether words, syllables, character sets, and/or the like of a closed caption segment are problematic. If the words, syllables, character sets, and/or the like are identified as problematic. The audio translation unit 140 may be used to determine (e.g., or access) compensating audio, translated audio, and/or the like that may be caused to be output at the appropriate time (e.g., determined by correlation unit 134).

If a content item has been previously processed, markers may be provided with the content item identifying problematic words, syllables, character sets, and/or the like. The markers may indicate a type of hearing impairment and/or a type of audio compensation to adjust the audio to address the hearing impairment. The user device 130 may use the markers to determine (e.g., or access, generate) the compensating audio and cause output (e.g., by generating new audio, playing pre-stored audio, by accessing an alternative audio track).

The impairment unit 138 may comprise a list (e.g., or database, dictionary) of problem sounds, words, syllables, characters, character sets, and/or the like. The impairment unit 138 may comprise one or more rules associated with problem sounds, words, syllables, characters, character sets, and/or the like. The one or more rules may comprise instructions regarding translation of the problem sounds, words, syllables, characters, character sets, and/or the like. The one or more rules may comprise instructions for modifying an original audio signal. The one or more rules may comprise a compensating audio signal to be added to an original audio signal. The one or more rules may comprise one or more audio filters (e.g., that shift frequency of the audio) to apply to the original audio signal. The impairment unit 138 may comprise one or more programming and/or software modules. The impairment unit 138 may comprise a portion of a programming and/or software module.

The impairment unit 138 may be configured to test a user for hearing loss. The test may determine a user's ability to hear one or more frequencies. The test may determine a user's ability to hear and/or understand certain words, sounds, syllables, character sets, and/or the like. User specific rules for replacing, modifying, and/or the like the original audio may be determined (e.g., or accessed, generated) based on the results of the test. The user specific rules may comprise a combination of one or more predefined rules associated with corresponding hearing impairments. The user specific rules may comprise predefined rules that are modified by adding exceptions (e.g., certain words that may be recognizable by the user without translation), changing parameters (e.g., increasing or decreasing an amount of frequency translation), and/or the like. The user specific rules may comprise a list, dictionary, data storage, and/or set of problematic sounds, words, syllables, characters, character sets, and/or the like for a specific user.

The impairment unit 138 may be configured to test the user for problematic words, sounds, syllables, characters, and/or the like. One or more sound clips may be output (e.g., to the audio device). The one or more sound clips may include different words, characters, sounds, syllables, frequencies, and/or the like. The impairment unit 138 may be configured to receive input from the user indicating whether the tested sound clip was understood, a level of understanding (e.g., easy, average, difficult, some understanding, no understanding), and/or the like. The user specific rules may be determined (e.g., or accessed) based on the input from the user. The impairment unit 138 may be configured to test by identifying problematic words. Words that are associated with the problematic words may be tested. Individual syllables, characters, character sets, and/or the like of the problematic words may be tested.

The words, syllables, characters, character sets, and/or the like that the user has difficulty hearing and/or understanding may be stored (e.g., as part of the user specific rules). Words, syllables, characters, character sets, and/or the like that have similar audio characteristics as the problematic words, syllables, characters, character sets, and/or the like identified in testing may be associated (e.g., as part of the user specific rules). A hearing specialist may associate problematic words, syllables, characters, character sets, and/or the like with a user.

The audio translation unit 140 may generate modified (e.g., frequency translated) audio associated with problem sounds and/or words. The modified audio may comprise a combination of a compensating audio signal and an original audio signal. The compensating audio may be generated in response to a content request and/or may be pre-stored on the user device 130. The compensating audio signal and an original audio signal may be combined (e.g., as a single audio track, as multiple audio tracks, output at the same time). The modified audio may comprise a single audio signal. The single audio signal may comprise a compensating portion and an original portion. The single audio signal may comprise audio altered to be within a frequency range. The audio translation unit 140 may comprise one or more programming and/or software modules. The audio translation unit 140 may comprise a portion of a programming and/or software module.

The audio translation unit 140 may determine (e.g., or access, generate) compensating audio associated with problem sounds and/or words. The compensating audio may comprise a stored sound, such as a sound clip. The stored sound may be a frequency translated character set, syllable, word, and/or the like (e.g., such as frequency translate fricative). The audio translation unit 140 may determine (e.g., or generate) compensating audio by applying an audio filter to translate the original audio. The audio translation unit 140 may determine the compensating audio by accessing a secondary audio track received with content. A plurality of secondary audio tracks may be sent with the content. Each of the secondary audio tracks may correspond to different hearing impairment settings.

Figure 2:
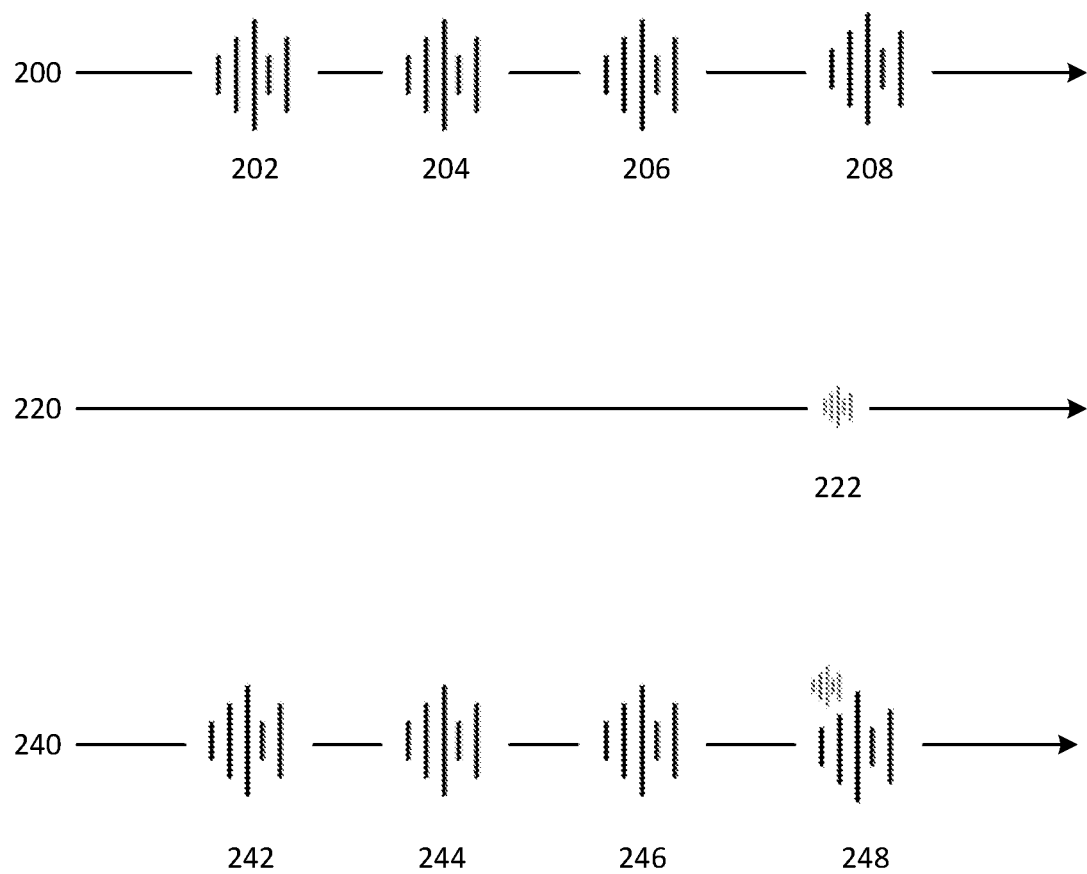
FIG. 2 shows example audio signals.

FIG. 2 shows example audio signals. Audio signal 200 may comprise audio data associated with a content asset. The audio signal 200 may comprise data indicative of one or more words 202, 204, 206, 208. The data indicative of one or more words 202, 204, 206, 208 may correspond to closed caption (CC) data. The data indicative of one or more words 202, 204, 206 may correspond to words that are not identified as problematic. Data indicative of a first word 202 may correspond to "now" in corresponding CC data. Data indicative of a second word 204 may correspond to "is" in corresponding CC data. Data indicative of a third word 206 may correspond to "the" in corresponding CC data. The data indicative of one or more words 208 may be identified as problematic. Data indicative of a fourth word 208 may correspond to "time" in corresponding CC data. "Time" may be identified as a problematic word. The "t" or "ti" sound in "time" may be identified as a problematic sound.

Audio signal 220 may comprise additional audio data 222 to help ensure a user heard data in the audio signal 200. The additional audio data 222 may assist a user in recognizing the fourth word in the audio signal 200. The additional audio data 222 may comprise compensating audio based on the problematic word and/or problematic sound. The additional audio data 222 may comprise a frequency translation (e.g., from a higher frequency to a lower frequency) of the problematic word and/or problematic sound. The additional audio data 222 may comprise audio data that, if combined with the audio signal, results in a frequency translation for the problematic word (e.g., or syllable, character set). It should be understood, that user with a hearing impairment may not hear the original audio. The original audio may be output at the same time as the additional audio data. The original audio may be output as a separate audio track from the additional audio data. The additional audio data may be output instead of the original audio (e.g., for a particular audio segment or portion thereof).

The additional audio data 222 may be stored audio data. A user device (e.g., user device 130) may store a plurality of audio clips associated with corresponding sounds, words, character sets, syllables, and/or the like. The user device may generate the additional audio data 222 by applying a frequency translation algorithm to the audio signal. The user device may also generate the additional audio data 222 by using an audio generation algorithm to generate an audio signal that, if combined with the audio signal 200, results in a frequency translated audio in a target range. The additional audio data may comprise audio outside of the target range. The additional audio data 222 may be generated (e.g., as described above or elsewhere herein) by any device, such as a device (e.g., content device 100, services device 120) upstream in a content network from the user device, a content server, a server that generates the closed caption data, a server that packages content, a server associated with generating frequency translated audio signals, and/or the like. The additional audio data 222 may be generated by one device (e.g., a first server) and stored on the device or another device (e.g., second server, user device). The user device may access the generated audio data 22 from the device that stores and/or generated the additional audio data.

Augmented audio signal 240 may comprise augmented audio. The audio signal 240 may comprise a combination (e.g., mixture, addition, etc.) of the audio signal 200 and the additional audio data 220. The augmented audio signal 240 may comprise data indicative of one or more augmented words 242, 244, 246, 248. If the first word 202 was not determined to be problematic, the data indicative of a first augmented word 242 may be the same or similar to the data indicative of the first word 202. If the second word 204 was not determined to be problematic, the data indicative of a second augmented word 244 may be the same or similar to the data indicative of the second word 204. If the third word was not determined to be problematic, the data indicative of a third augmented word 246 may be the same or similar to the data indicative of the third word 206. If the fourth word 208 was determined to be problematic, the data indicative of a fourth augmented word 248 may comprise the data indicative of the fourth word 208 and the additional audio data 222. The data indicative of the fourth augmented word 248 may comprise (e.g., be a combination of) a first signal indicative of the fourth word and a second signal indicative of the additional audio data 222. The data indicative of the fourth augmented word 248 may comprise a signal comprising (e.g., a combination of) by the fourth word and the additional audio data 222.

Figure 3:
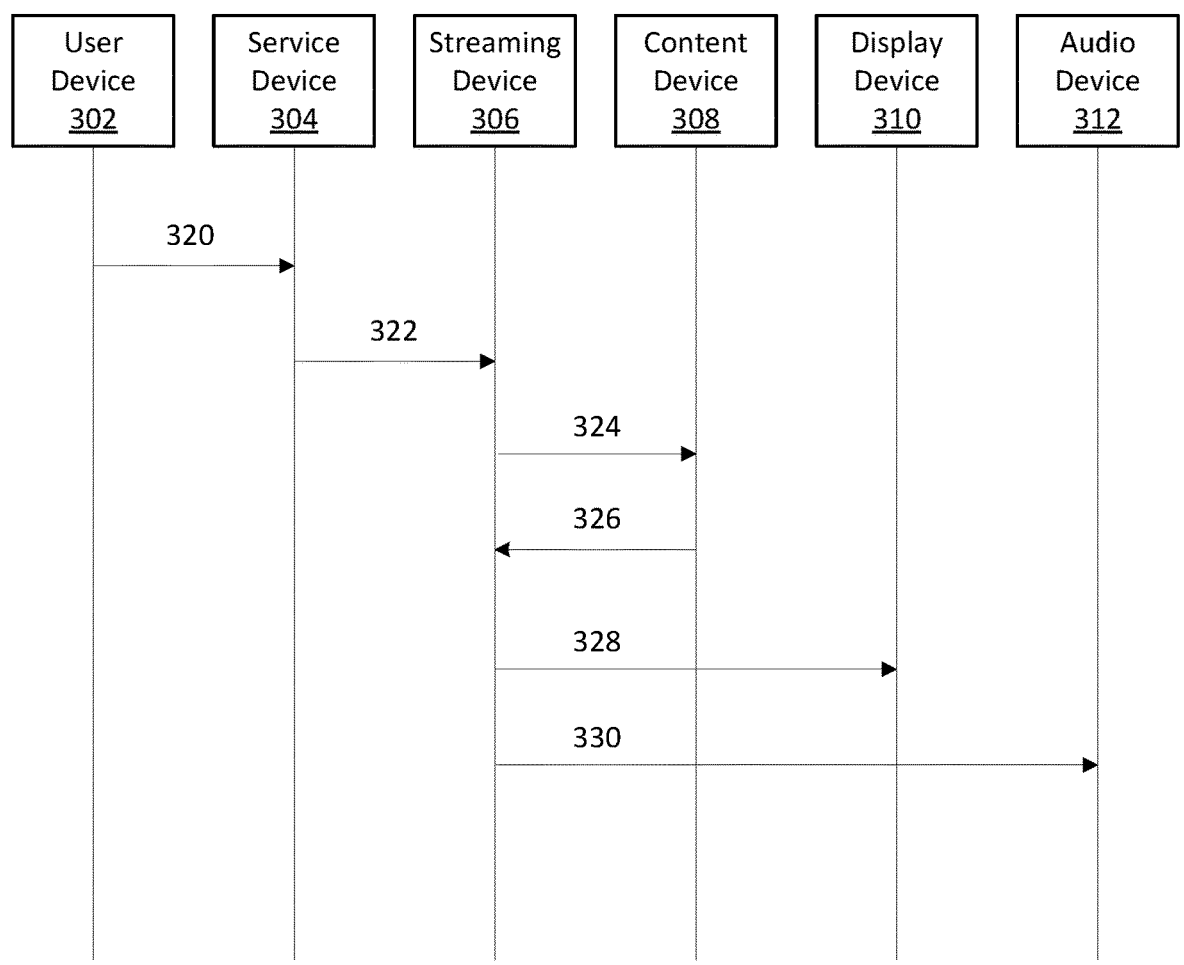
FIG. 3 is a sequence diagram showing example flows of operation.

FIG. 3 is a sequence diagram showing example flows of operation. The sequence diagram may comprise a user device 302, a service device 304, a streaming device 306, a content device 308, a display device 310, and an audio device 312. The user device 302 may comprise the user device 130 in FIG. 1. The service device 304 may comprise the services device 120 in FIG. 1. The streaming device 306 may comprise a digital streaming device, a television, a set-top box, a computing station, a tablet device, a mobile device, and/or the like. In some implementations, the content device 308 may be understood as a media file, such as a disk, media stick, or hard drive. In such implementations, the streaming device 306 may comprise a digital disc player (e.g., a DVD player, a BLUERAY player), a computing device configured to access media from a media stick or hard drive, and/or the like. The content device 308 may comprise the content device 100 in FIG. 1. The display device 310 may comprise the display device 150 in FIG. 1. The audio device 312 may comprise the audio device 160 in FIG. 1.

At 320, the user device 302 may access the service device 304. The user device 302 may comprise a user device associated with a user. The user device 302 may comprise a user device associated with a hearing specialist associated with a user. At 320, the user and/or the hearing specialist associated with the user may provide data indicative of a hearing impairment associated with the user. The data indicative of the hearing impairment may comprise a hearing profile. The hearing profile may indicate hearing loss at one or more frequencies (e.g., frequency ranges). The hearing profile may indicate one or more problematic sounds, problematic words, and/or the like. The data indicative of the hearing impairment may be received via a graphical user interface on the user device 302. The data indicative of the hearing impairment may be transmitted from the user device 302 to the service device 304. The data indicative of the hearing impairment may be saved as part of a profile associated with the user.

At 322, settings associated with may be sent from the service device 304 to the streaming device 306. The streaming device 306 may associate the user with a hearing impairment based on the settings. At 324, a user may request content from the content device 308 via the streaming device 306. The request for content may comprise a request for a program, a show, a movie, a channel, etc. The request may comprise an indication of the user and/or the streaming device 306. At 326, the content device 308 may transmit the requested content to the streaming device 306. The content device 306 may or may not perform analysis on audio data associated with the requested content and may or may not perform corrective action for sounds and/or words identified as problematic.

If the content device 308 performed analysis and/or corrective action, then the streaming device 306 may process and present the requested content as the content is received. If the content device 308 did not perform analysis and/or corrective action, then the streaming device 306 may perform analysis on audio data associated with the requested content and may perform corrective action for sounds and/or words identified as problematic.

At 328, the streaming device 306 may cause video data associated with the requested content to be outputted on the display device 310. When corrective action is taken, the streaming device 306 may cause the display device 310 to display a visual indicator. The visual indicator may comprise a flashing light. The visual indicator may comprise a problematic sound and/or word.

At 330, the streaming device 306 may cause audio data associated with the requested content to be outputted by the audio device 312. When corrective action is taken, the streaming device 306 may cause the audio device 312 to output an audio signal with original audio combined with compensating audio. The compensating audio may be generated (e.g., by a device requesting the content), pre-stored, downloaded, and/or accessed in a separate stream (e.g., or separate audio track of the content). When corrective action is taken, the streaming device 306 may cause the audio device 312 to output an audio signal that is a result of frequency translation being performed on original audio.

Figure 4:
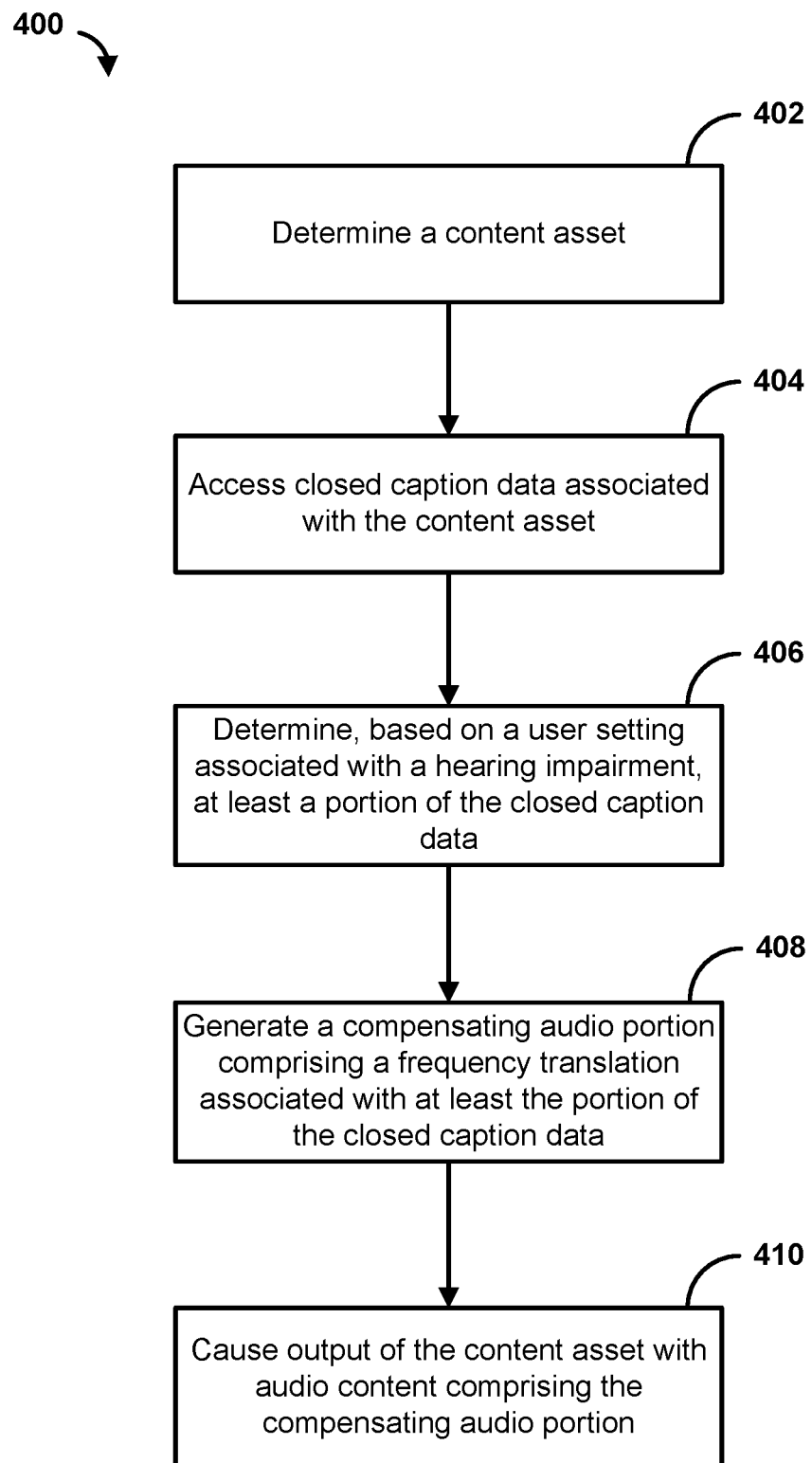
FIG. 4 is a flow diagram showing an example method.

FIG. 4 is a flow diagram showing an example method 400. The method 400 may be implemented by a user device (e.g., user device 130, a set-top box, mobile device, streaming device), a device upstream of the user device in a content network, a server (e.g., content device 100, services device 120, packager, transcoder, converged access platform device), a device associated with storing closed caption text, a device associated with generating closed caption text, any device that can access the closed captioned text, a combination thereof, and/or the like.

At 402, a content asset may be determined (e.g., or accessed). The content asset may comprise video content, audio content, closed caption data, and/or the like. The content asset may comprise a show, a recording, a movie, a content channel (e.g., live television channel). The user device 130 in FIG. 1 may determine a content asset. Determining the content asset may comprise determining (e.g., or accessing) the content asset based on receiving data indicative of a request for the content asset from a user.

At 404, closed caption data associated with the content asset may be accessed (e.g., or determined). The user device 130 in FIG. 1 may access closed caption data associated with the content asset. The closed caption data may be received with the content asset. The closed caption data may be accessed by accessing (e.g., or analyzing) the content asset (e.g., by obtaining the closed caption data in one or more video frames and/or video fields). The closed caption data may be accessed in a closed caption file, closed caption stream, closed caption database, and/or the like.

At 406, at least a portion of the closed caption data may be determined (e.g., or accessed). At least a portion of the closed caption data may be determined based on a user setting associated with a hearing impairment. The user device 130 in FIG. 1 may determine (e.g., or access) at least a portion of the closed caption data based on the user setting associated with a hearing impairment. The user setting associated with the hearing impairment may be determined (e.g., or accessed) based on (e.g., in response to) the request. The user device 130 in FIG. 1 may determine (e.g., or access) the user setting associated with the hearing impairment based on the request. Determining the closed caption data may be based on determining (e.g., or accessing) the user setting associated with the hearing impairment.

Determining at least a portion of the closed caption data may comprise determining that the closed caption data comprises one or more of a word or set of characters (e.g., syllables) associated with the hearing impairment. The word may comprise the set of characters. The word and/or set of characters may be associated with a frequency. The set of characters may comprise one character, two characters, and/or the like. The set of characters may comprise one or more consonants, such as hard consonants. The set of characters may comprise a hard consonant followed by a vowel (e.g., ti, ta, fa). The set of characters may comprise f, s, th, k, t, ch, sh, and/or the like. The set of characters may comprise fricative sounds (e.g., fricative consonants). A fricative sound may comprise, for example, any of the following sounds, which are shown using phonetic symbols (e.g., IPA phonetic symbols): /f, θ, s, ʃ, v, ð, z, ʒ, h/. A fricative sound may be produced by partially obstructing the airflow through the oral cavity.

Determining at least the portion of the closed caption data may comprise determining a location of the set of consonants. The hearing impairment may only be associated with certain locations. The location may be the beginning of the word, the middle of the word, or the end of the word. If the location is at the beginning of the word, then the characters may be associated with the hearing impairment. The location may be the location of a syllable, a combination of syllables (e.g., or other character set), and/or the like.

Determining at least the portion of the closed caption data may comprise searching the closed caption data for the word and/or the set of characters. A group of words maybe associated with the hearing impairment. One or more (or each) of the words of the group of words may compared to the words in the closed caption data.

The user setting associated with the hearing impairment may indicate that the user is unable to hear sounds in a frequency range. At least the portion of closed caption data may be determined (e.g., or accessed) based on one or more characters of the closed caption data being associated with the frequency range. The frequency range may be associated with high frequency hearing loss. The frequency range may comprise about 1,000 Hz to about 10,000 Hz. The frequency range may comprise about 1,500 Hz to about 6,000 Hz. The frequency range may comprise about 3,000 Hz to about 6,000 Hz. The frequency range may comprise about 1,500 Hz to about 8,000 Hz. The frequency range may comprise about 3,000 Hz to about 8,000 Hz. The frequency range may be specific to a user. Testing may be performed (e.g., via an app or streaming device, or using specialized hearing testing equipment) to determine the frequency range of a specific user.

At 408, a compensating audio portion may be generated (e.g., or otherwise determined, accessed). The compensating audio portion may comprise a frequency translation associated with (e.g., triggered based on, performed for, performed based on, corresponding to) at least the portion of the closed caption data. The user device 130 in FIG. 1 may generate a compensating audio comprising a frequency translation associated at least the portion of the closed caption data. Compensating audio for a variety of sounds may be previously generated and/or stored. The compensating audio may comprise a sound, syllable, character set, and/or word that is translated. The compensating audio may comprise a plurality of fricative sounds that are translated to lower frequencies. The sound, syllable, character set, and/or word may be translated by a different amount depending on whether the speaker has a higher or lower pitched voice (e.g., is female or male, adult or child). The compensating audio may be generated in response to receiving a content asset (e.g., or in response to determining the portion of the closed caption data in step 406). A signal processing technique (e.g., audio filter) may be used to translate (e.g., shift down in frequency) the frequency of the original audio. An audio clip may be generated based on text to speech conversion (e.g., using the portion of the closed caption data). Frequency translation may be performed on the audio clip. A default audio clip may be stored for a word, syllable, set of characters, and/or the like. The default audio clip may be determined (e.g., or accessed) based on the portion of the closed caption data. Frequency translation may be performed on the default audio clip. The amount of frequency translation (e.g., amount of the shift from one frequency to another) may be based on a user setting (e.g., user profile data, hearing impairment setting).

At 410, the content asset may be caused to be output with audio content. The audio content may comprise the compensating audio portion. The audio content may comprise the original audio. The compensating audio and the original audio may be separate audio tracks. The compensating audio and the original audio may be combined as single audio track. The user device 130 in FIG. 1 may cause output of the content asset with audio content comprising the compensating audio and the original audio. The compensating audio and original audio may be output via a speaker. The compensating audio and original audio may be output via a hearing aid. The compensating audio may be output via a hearing aid and the original audio may be output via a speaker.

One or more of a time or a position may be determined in the original audio that corresponds to the portion of the closed caption data. The user device 130 in FIG. 1 may determine one or more of a time or a position in the original audio that corresponds to the portion of the closed caption data. The compensating audio may be added to the original audio at one or more of the time or position. The user device 130 in FIG. 1 may add the compensating audio to the original audio at one or more of the time or position.

Determining one or more of the time or the position in the original audio may comprise performing speech-to-text recognition on the original audio to generate a plurality of words. The plurality of words may be associated with (e.g., tracked, stored) corresponding times and/or positions of the original audio. The portion of the closed caption data (e.g., word or set of characters) may be matched to the plurality of words. A corresponding time and/or position associated with a matched word of the plurality of words may be used as a basis for outputting the compensating audio, adding the compensating audio to the original audio, combining the compensating audio and the original audio, or a combination thereof.

Determining one or more of the time or the position in the original audio may comprise performing frequency detection by analyzing frequencies of the original audio. Analyzing frequencies may comprise analyzing the frequencies within a threshold time or threshold position of the corresponding time associated with the matched word.

Output of an indicator indicative of frequency translation being performed may be caused for at least the portion of the closed caption data. The user device 130 in FIG. 1 may cause output of an indicator indicative of frequency translation being performed for at least the portion of the closed caption data. The indicator may comprise a visual indicator. The visual indicator may comprise an image, a flash, a visual effect, a notification, a combination thereof, and/or the like. The indicator may be output in an overlay above the content. The indicator may be output by modifying a characteristic of the content asset, such as a contrast, brightness, and/or the like. The indicator may be output by inserting the indicator into the content. A frame comprising the indicator may be inserted into the content. The content may be paused while the indicator is output.

A user may request a program (e.g., show, movie, etc.) via a set-top box (e.g., or other computing device). The set-top box may comprise a user profile associated with the user. The user profile may indicate that the user has high frequency hearing loss. The set-top box may determine (e.g., or access) closed caption (CC) data associated with the program and analyze the CC data before associated audio data is output to the user. The set-top box may identify problem words in the CC data. A compensating audio sound may be generated for identified problem words. The compensating audio sound may comprise a lower frequency than an associated identified problem word. The set-top box may correlate the compensating audio sound with a position in audio data associated with the associated identified word. The set-top box may cause the correlated compensating audio sound and audio data to be output to the user.

Figure 5:
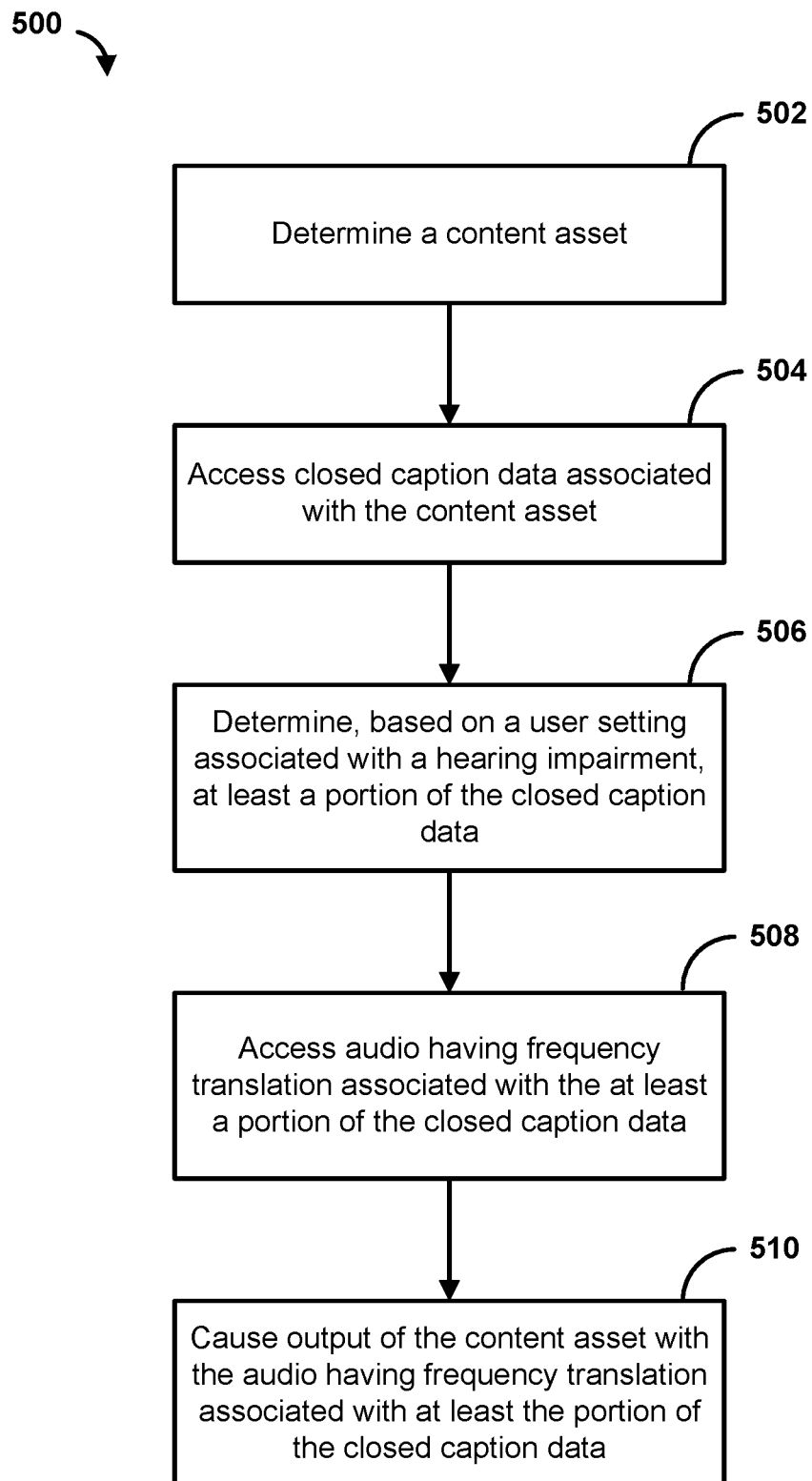
FIG. 5 is a flow diagram showing an example method.

FIG. 5 is a flow diagram showing an example method 500. The method 500 may be implemented by a user device (e.g., user device 130, a set-top box, mobile device, streaming device), a device upstream of the user device in a content network, a server (e.g., content device 100, services device 120, packager, transcoder, converged access platform device), a device associated with storing closed caption text, a device associated with generating closed caption text, any device that can access the closed captioned text, a combination thereof, and/or the like.

At 502, a content asset may be determined (e.g., or accessed). The user device 130 in FIG. 1 may determine (e.g., or access) a content asset. The content asset may comprise video content, audio content, closed caption data, and/or the like. The content asset may comprise a show, a recording, a movie, a content channel (e.g., live television channel). Determining the content asset may comprise determining (e.g., or accessing) the content asset based on receiving data indicative of a request for the content asset from a user.

At 504, closed caption data associated with the content asset may be accessed (e.g., or determined). The user device 130 in FIG. 1 may access closed caption data associated with the content asset. The closed caption data may be received with the content asset. The closed caption data may be accessed in the content asset (e.g., by obtaining the closed caption data in one or more video frames and/or video fields). The closed caption data may be accessed in a closed caption file, closed caption stream, closed caption database, and/or the like.

At 506, at least a portion of the closed caption data may be determined (e.g., or accessed) based on a user setting associated with a hearing impairment. The user device 130 in FIG. 1 may determine at least a portion of the closed caption data based on a user setting associated with a hearing impairment. The user setting associated with the hearing impairment may be determined (e.g., or accessed) based on the request. The user device 130 in FIG. 1 may determine (e.g., or access) the user setting associated with the hearing impairment based on the request. Determining the closed caption data may be based on determining (e.g., or accessing) the user setting associated with the hearing impairment.

Determining at least a portion of the closed caption data may comprise determining that the closed caption data comprises one or more of a word or set of characters associated with the hearing impairment. The word may comprise the set of characters. The word and/or set of characters may be associated with a frequency. The set of characters may comprise one character, two characters, and/or the like. The set of characters may comprise one or more consonants, such as hard consonants. The set of characters may comprise a hard consonant followed by a vowel (e.g., ti, ta, fa). The set of characters may comprise f, s, th, k, t, ch, sh, and/or the like. The set of characters may comprise fricative sounds (e.g., fricative consonants). A fricative sound may comprise, for example, any of the following sounds, which are shown using the phonetic alphabet: /f, θ, s, ʃ, v, d, z, 3, h/. A fricative sound may be produced by partially obstructing the airflow through the oral cavity.

Determining at least the portion of the closed caption data may comprise determining a location of the set of consonants. The hearing impairment may only be associated with certain locations. The location may be the beginning of the word, the middle of the word, or the end of the word. If the location is at the beginning of the word, then the characters may be associated with the hearing impairment.

Determining at least the portion of the closed caption data may comprise searching the closed caption data for the word and/or the set of characters. A group of words maybe associated with the hearing impairment. One or more (or each) of the words of the group of words may compared to the words in the closed caption data.

The user setting associated with the hearing impairment may indicate that the user is unable to hear sounds in a frequency range. At least the portion of closed caption data may be determined based on one or more characters of the closed caption data being associated with the frequency range. The frequency range may be associated with high frequency hearing loss. The frequency range may comprise about 1,000 Hz to about 10,000 Hz. The frequency range may comprise about 1,500 Hz to about 6,000 Hz. The frequency range may comprise about 3,000 Hz to about 6,000 Hz. The frequency range may comprise about 1,500 Hz to about 8,000 Hz. The frequency range may comprise about 3,000 Hz to about 8,000 Hz.

At 508, audio having frequency translation associated with the at least a portion of the closed caption data may be accessed (e.g., or determined, generated). The audio may be accessed at a user device, a server (e.g., at another location/premises), and/or the like. The user device and/or the server may comprise a data store (e.g., dictionary) of words, sets of characters, syllables and/or the like and corresponding frequency translated audio. The user device may match the portion of the closed caption data to the corresponding data store entry to access stored frequency translated audio (e.g., stored at the user device and/or at the server).

At 510, the content asset may be caused to be outputted. The content asset may be caused to be outputted with the audio having frequency translation. The frequency translation may be associated with (e.g., triggered based on, performed for, performed based on, corresponding to) the at least the portion of the closed caption data. The content asset with audio having frequency translation performed may be caused to be outputted for at least the portion of the closed caption data. The user device 130 in FIG. 1 may cause output of the content asset with audio having frequency translation performed associated with at least the portion of the closed caption data. The audio may be output via a speaker, a hearing aid, a combination thereof, and/or the like.

One or more of a time or a position may be determined in original audio associated with the content asset that corresponds to the portion of the closed caption data. The user device 130 in FIG. 1 may determine one or more of a time or a position in original audio associated with the content asset that corresponds to the portion of the closed caption data. The frequency translation may be added to the original audio at one or more of the time or position. The user device 130 in FIG. 1 may add the frequency translation to the original audio at one or more of the time or position.

Determining one or more of the time or the position in the original audio may comprise performing speech-to-text recognition on the original audio to generate a plurality of words. The plurality of words may be associated with (e.g., tracked, stored) corresponding times and/or positions of the original audio. The portion of the closed caption data (e.g., word or set of characters) may be matched to the plurality of words. A corresponding time and/or position associated with a matched word of the plurality of words may be used as a basis for where the frequency translation is performed.

Determining one or more of the time or the position in the original audio may comprise performing frequency detection by analyzing frequencies of the original audio. Analyzing frequencies may comprise analyzing the frequencies within a threshold time or threshold position of the corresponding time associated with the matched word.

Output of an indicator indicative of frequency translation being performed may be caused for at least the portion of the closed caption data. The user device 130 in FIG. 1 may cause output of an indicator indicative of frequency translation being performed for at least the portion of the closed caption data. The indicator may comprise a visual indicator. The visual indicator may comprise an image, a flash, a visual effect, a notification, a combination thereof, and/or the like. The indicator may be output in an overlay above the content. The indicator may be output by modifying a characteristic of the content, such as a contrast, brightness, and/or the like. The indicator may be output by inserting the indicator into the content. A frame comprising the indicator may be inserted into the content. The content may be paused while the indicator is output.

A user may request a program (e.g., show, movie, etc.) via a set-top box (e.g., or other computing device). The set-top box may comprise a user profile associated with the user. The user profile may indicate that the user has high frequency hearing loss. The set-top box may determine (e.g., or access) closed caption (CC) data associated with the program and analyze the CC data before associated audio data is presented. The set-top box may identify problem words in the CC data. A frequency translation may be retrieved for identified problem words. The frequency translation may be performed, resulting in a lower frequency in the audio data than a frequency associated with the identified problem word. The set-top box may perform the frequency translation at a position in audio data associated with the associated identified word to create altered audio data. The frequency translation may be performed by applying a filter (e.g., to specific portions of the audio data associated with corresponding problem words) or other audio algorithm. The set-top box may cause the altered audio data to be presented to the user.

Figure 6:
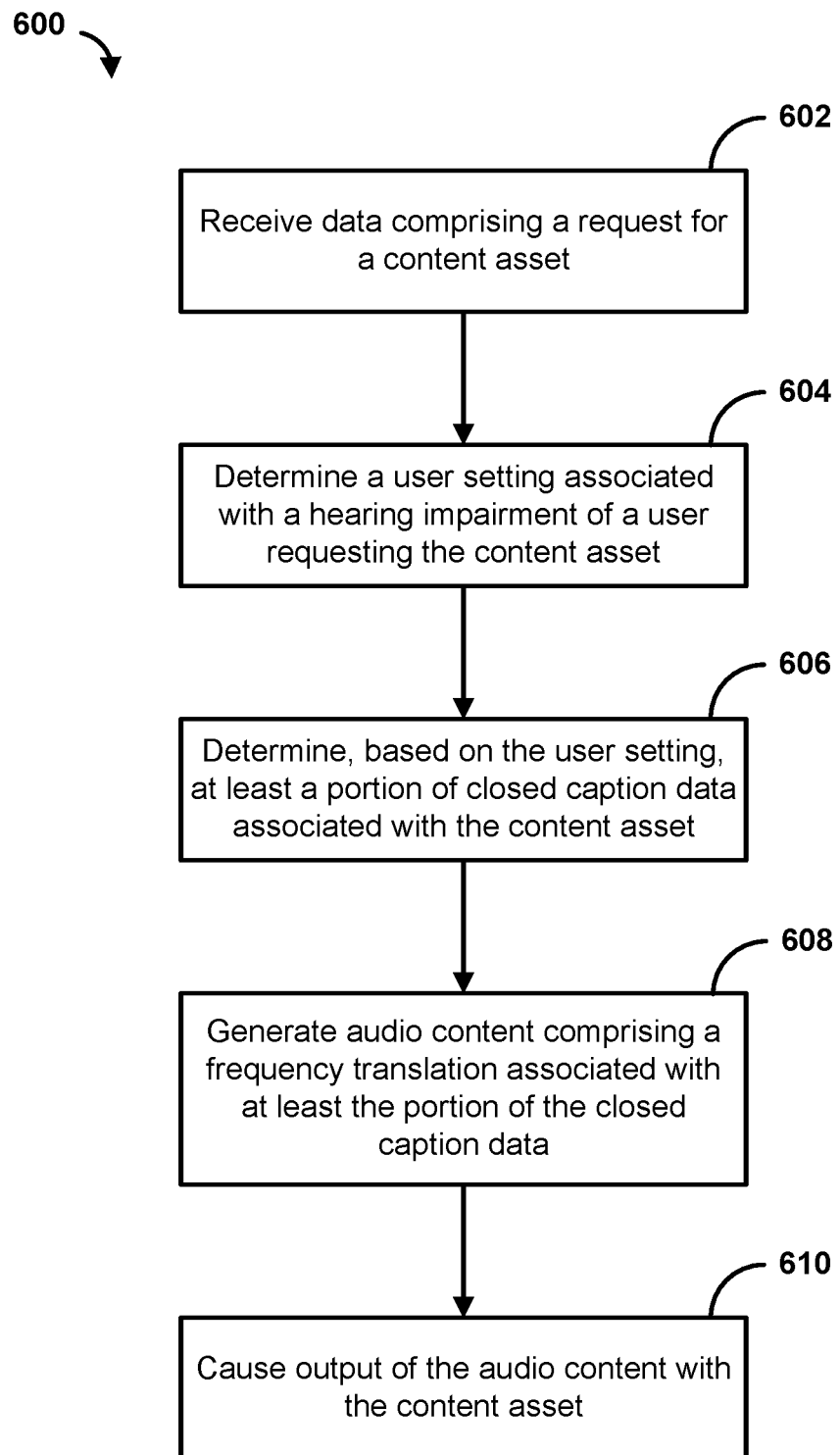
FIG. 6 is a flow diagram showing an example method.

FIG. 6 is a flow diagram showing an example method 600. The method 600 may be implemented by a user device (e.g., user device 130, a set-top box, mobile device, streaming device), a device upstream of the user device in a content network, a server (e.g., content device 100, services device 120, packager, transcoder, converged access platform device), a device associated with storing closed caption text, a device associated with generating closed caption text, any device that can access the closed captioned text, a combination thereof, and/or the like.

At 602, data comprising (e.g., or indicative of) a request for a content asset may be received. The data may be received by a content streaming device (e.g., content device, content server, edge device, set-top box, digital streaming device). The content asset may comprise video content, audio content, closed caption data, and/or the like. The content asset may comprise a show, a recording, a movie, a content channel (e.g., live television channel). The streaming device 306 in FIG. 3 may receive data indicative of request for a content asset.

At 604, a user setting associated with a hearing impairment of a user requesting the content asset may be determined (e.g., or accessed). The streaming device 306 in FIG. 3 may determine (e.g., or access) a user setting associated with a hearing impairment of a user requesting the content asset. The user setting may be determined by accessing a user profile, such as a hearing profile. The user setting may be stored on the content streaming device. The user setting (e.g., or hearing aid profile) may be sent from another computing device, such as a server, to the user device. The other computing device may be associated with a user interface for users, hearing specialists, and/or the like to enter data for a hearing profile (e.g., and other settings data).

At 606, at least a portion of closed caption data associated with the content asset may be determined (e.g., or access) based on the user setting. The streaming device 306 in FIG. 3 may determine at least a portion of closed caption data associated with the content asset based on the user setting. The closed caption data may be received with the content asset. The closed caption data may be determined by accessing the content asset (e.g., by obtaining the closed caption data in one or more video frames and/or video fields). The closed caption data may be determined by accessing a closed caption file, closed caption stream, closed caption database, and/or the like.

Determining at least a portion of the closed caption data may comprise determining that the closed caption data comprises one or more of a word or set of characters associated with the hearing impairment. The word may comprise the set of characters. The word and/or set of characters may be associated with a frequency. The set of characters may comprise one character, two characters, and/or the like. The set of characters may comprise one or more consonants, such as hard consonants. The set of characters may comprise a hard consonant followed by a vowel (e.g., ti, ta, fa). The set of characters may comprise f, s, th, k, t, ch, sh, and/or the like. The set of characters may comprise fricative sounds (e.g., fricative consonants). A fricative sound may comprise, for example, any of the following sounds, which are shown using the phonetic alphabet: /f, θ, s, ʃ, v, d, z, 3, h/. A fricative sound may be produced by partially obstructing the airflow through the oral cavity.

Determining at least the portion of the closed caption data may comprise determining a location of the set of consonants. The hearing impairment may only be associated with certain locations. The location may be the beginning of the word, the middle of the word, or the end of the word. If the location is at the beginning of the word, then the characters may be associated with the hearing impairment.

Determining at least the portion of the closed caption data may comprise searching the closed caption data for the word and/or the set of characters. A group of words maybe associated with the hearing impairment. One or more (or each) of the words of the group of words may compared to the words in the closed caption data. The user setting associated with the hearing impairment may indicate that the user is unable to hear sounds in a frequency range. At least the portion of closed caption data may be determined based on one or more characters of the closed caption data being associated with the frequency range.

The user setting associated with the hearing impairment may indicate that the user is unable to hear sounds in a frequency range. At least the portion of closed caption data may be determined based on one or more characters of the closed caption data being associated with the frequency range. The frequency range may be associated with high frequency hearing loss. The frequency range may comprise about 1,000 Hz to about 10,000 Hz. The frequency range may comprise about 1,500 Hz to about 6,000 Hz. The frequency range may comprise about 3,000 Hz to about 6,000 Hz. The frequency range may comprise about 1,500 Hz to about 8,000 Hz. The frequency range may comprise about 3,000 Hz to about 8,000 Hz.

At 608, audio content comprising a frequency translation associated with (e.g., triggered based on, performed for, performed based on, corresponding to) at least the portion of the closed caption data may be generated (e.g., or determined, accessed). The streaming device 306 in FIG. 3 may generate audio content comprising a frequency translation associated with at least the portion of the closed caption data. A portion of the original corresponding to the problem word and/or problem sound may be determined.

Generating audio content comprising the frequency translation associated with at least the portion of the closed caption data may comprise determining one or more of a time or a position in original audio associated with the content asset that corresponds to the portion of the closed caption data and adding, at one or more of the time or position, the frequency translation to the original audio.

Determining one or more of the time or the position in the original audio may comprise performing speech-to-text recognition on the original audio to generate a plurality of words. The plurality of words may be associated with (e.g., tracked, stored) corresponding times and/or positions of the original audio. The portion of the closed caption data (e.g., word or set of characters) may be matched to the plurality of words. A corresponding time and/or position associated with a matched word of the plurality of words may be used as a basis for where the frequency translation is performed.

Determining one or more of the time or the position in the original audio may comprise performing frequency detection by analyzing frequencies of the original audio. Analyzing frequencies may comprise analyzing the frequencies within a threshold time or threshold position of the corresponding time associated with the matched word.

The frequency translation may comprise a modification of a sound having a first frequency to a sound having a second frequency. The second frequency may be a lower frequency than the first frequency. The frequency translation may be performed by applying a filter, process, and/or the like that causes at least a portion of the original audio to modified. The frequency translation may be performed by applying a filter, process, and/or the like that causes a default audio clip (e.g., default audio clip for a word, syllable, or set of characters) to be modified.

At 610, the audio content may be caused to be outputted with the content asset. The streaming device 306 in FIG. 3 may cause output of the audio content with the content asset. If the content streaming device is a server, the content streaming device may send the content asset (e.g. including the audio content) to a user device (e.g., set-top box). The content streaming device may generate an alternative audio stream comprising the frequency translation. The content streaming device may generate an updated index file that associates video segments with audio segments of the alternative audio stream. The updated index file may be sent to the user device. The user device may request the audio segments of the alternative audio stream.

An indicator indicative of frequency translation being performed may be caused to be outputted. The streaming device 306 in FIG. 3 may cause output of an indicator indicative of frequency translation being performed. The indicator may comprise a visual indicator. The visual indicator may comprise an image, a flash, a visual effect, a notification, a combination thereof, and/or the like. The indicator may be output in an overlay above the content. The indicator may be output by modifying a characteristic of the content, such as a contrast, brightness, and/or the like. The indicator may be output by inserting the indicator into the content. A frame comprising the indicator may be inserted into the content. The content may be paused while the indicator is output.

A user may request a program (e.g., show, movie, etc.) via a set-top box. The set-top box may transmit the request to a video-on demand (VoD) server (e.g., or a content server associated with a live content stream). The VoD server may comprise a user profile associated with the user. The user profile may indicate that the user has high frequency hearing loss. The VoD server may access closed caption (CC) data associated with the program and analyze the CC data. The VoD server may access closed caption (CC) data associated with the program and analyze the CC data before associated audio data is output to the user. The VoD server may access closed caption (CC) data associated with the program in request to receiving the request. The VoD server may identify problem words in the CC data. A frequency translation may be determined (e.g., or accessed) for modifying audio associated with one or more identified problem words. The frequency translation may be performed, resulting in a lower frequency in the audio data than a frequency associated with the identified problem word. The VoD server may perform the frequency translation at a position in audio data associated with the associated identified word to create altered audio data. The VoD server may transmit the altered audio data to the set-top box (e.g., or other user device). The set-top box may cause the altered audio data to be output to the user.

Figure 7:
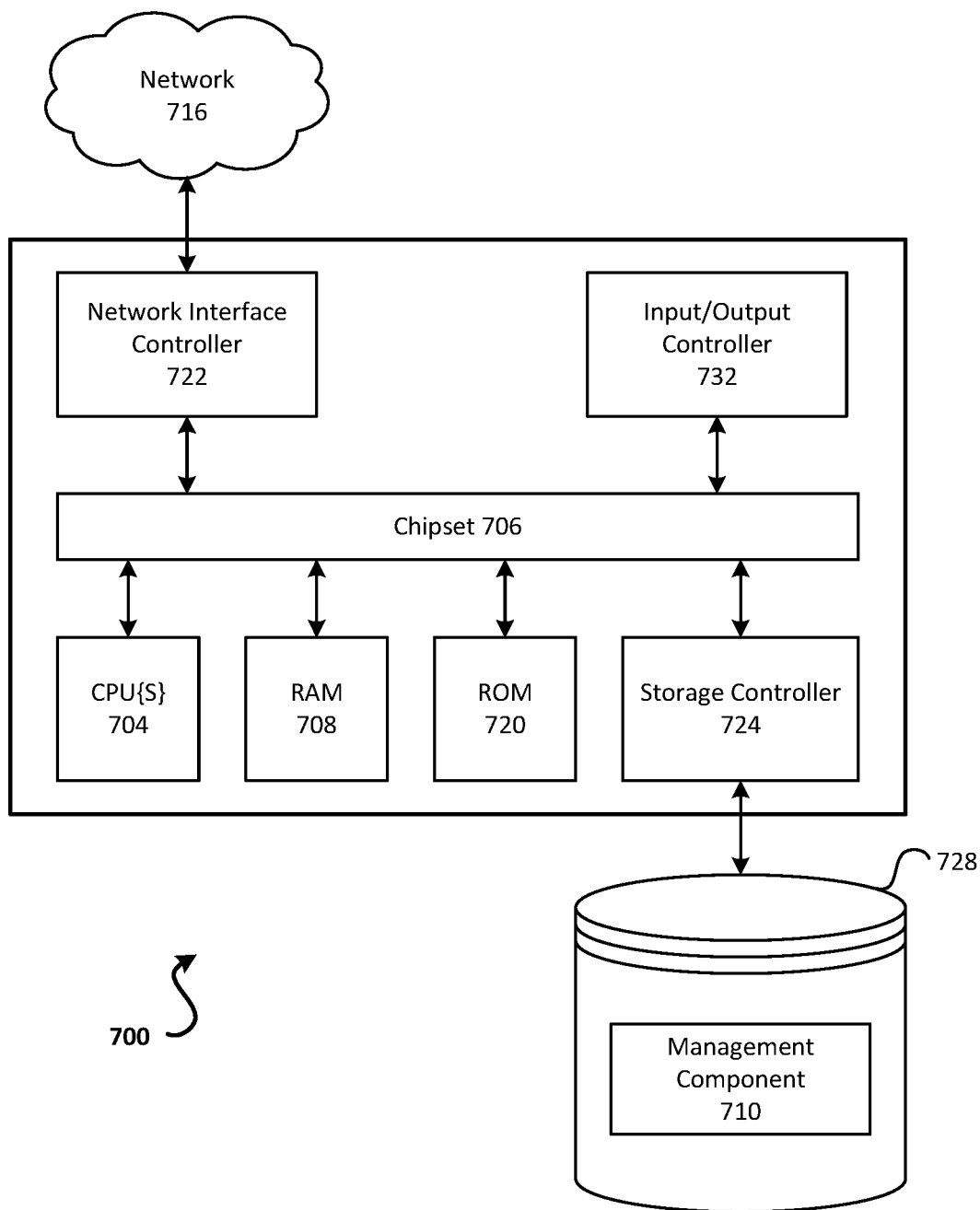
FIG. 7 is a block diagram illustrating an example computing device.

FIG. 7 depicts a computing device that may be used in various aspects, such as the servers, modules, and/or devices depicted in FIG. 1. With regard to the example architecture of FIG. 1, the content device 100, services device 120, user device 130, display device 150, and audio device 160 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 4, FIG. 5, and FIG. 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described in relation to FIG. 4, FIG. 5, and FIG. 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   determining closed caption data associated with a content asset;
   determining, in the closed caption data, at least a portion of a word associated with a hearing impairment, wherein the hearing impairment is associated with a user; and
   causing, based on an association of compensation information with the at least the portion of the word, output of audio associated with the at least the portion of the word.

2. The method of claim 1, wherein the compensation information comprises an indication to perform one or more of: processing the audio, applying a filter, applying a frequency translation, replacing at least the portion of the word, modifying at least the portion of the word, replacing a sound, modifying a sound, or displaying a notification.

3. The method of claim 1, wherein the compensation information comprises one or more of: an input parameter of a process to generate the audio, an input parameter of a process to modify the audio, an amount of frequency translation to apply to generate audio, a time to apply frequency translation to generate the audio, or a location to apply frequency translation to generate the audio.

4. The method of claim 1, wherein causing the output of the audio comprises one or more of: generating at least a portion of the audio based on the compensation information, selecting at least a portion of the audio based on the compensation information, or modifying at least a portion the audio based on the compensation information.

5. The method of claim 1, wherein determining the at least the portion of the word comprises determining that the closed caption data comprises a set of characters associated with the hearing impairment.

6. The method of claim 1, wherein determining the at least a portion of the word comprises determining, based on analyzing characters in the closed caption data, one or more characters, syllables, or words associated with the hearing impairment.

7. The method of claim 1, wherein determining closed caption data associated with the content asset comprises accessing the closed caption data in one or more of:
   a closed caption file, a closed caption stream, a closed caption database, a segment of a transport stream, a content frame, or a field of content data.

8. The method of claim 1, further comprising:
   determining an estimated time associated with the audio that correlates to at least the portion of the word; and
   applying, based on the estimated time associated with the audio, a corrective action associated with the content asset to one or more of modify, select, or generate the audio.

9. A device comprising:
   one or more processors; and
   memory storing instructions that, when executed by the one or more processors, cause the device to:
   determine closed caption data associated with a content asset;
   determine, in the closed caption data, at least a portion of a word associated with a hearing impairment, wherein the hearing impairment is associated with a user; and
   cause, based on an association of compensation information with the at least the portion of the word, output of audio associated with the at least the portion of the word.

10. The device of claim 9, wherein the compensation information comprises an indication to perform one or more of: processing the audio, applying a filter, applying a frequency translation, replacing at least the portion of the word, modifying at least the portion of the word, replacing a sound, modifying a sound, or displaying a notification.

11. The device of claim 9, wherein the compensation information comprises one or more of: an input parameter of a process to generate the audio, an input parameter of a process to modify the audio, an amount of frequency translation to apply to generate audio, a time to apply frequency translation to generate the audio, or a location to apply frequency translation to generate the audio.

12. The device of claim 9, wherein the instructions that, when executed by the one or more processors, cause the device to cause the output of the audio comprises instructions that, when executed by the one or more processors, cause the device to one or more of: generate at least a portion of the audio based on the compensation information, select at least a portion of the audio based on the compensation information, or modify at least a portion the audio based on the compensation information.

13. The device of claim 9, wherein the instructions that, when executed by the one or more processors, cause the device to determine at least the portion of the word comprises instructions that, when executed by the one or more processors, cause the device to determine that the closed caption data comprises a set of characters associated with the hearing impairment.

14. The device of claim 9, wherein the instructions that, when executed by the one or more processors, cause the device to determine the at least the portion of the word comprises instructions that, when executed by the one or more processors, cause the device to determine, based on analyzing characters in the closed caption data, one or more characters, syllables, or words associated with the hearing impairment.

15. The device of claim 9, wherein the instructions that, when executed by the one or more processors, cause the device to determine closed caption data associated with the content asset comprises instructions that, when executed by the one or more processors, cause the device to access the closed caption data in one or more of: a closed caption file, a closed caption stream, a closed caption database, a segment of a transport stream, a content frame, or a field of content data.

16. The device of claim 9, wherein the instructions, when executed by the one or more processors, further cause the device to:
  determine an estimated time associated with the audio that correlates to at least the portion of the word; and
  apply, based on the estimated time associated with the audio, a corrective action associated with the content asset to one or more of modify, select, or generate the audio.

17. A system comprising:
  a server configured to send a content asset; and
  a computing device configured to:
    determine closed caption data associated with the content asset;
    determine, in the closed caption data, at least a portion of a word associated with a hearing impairment, wherein the hearing impairment is associated with a user; and
    cause, based on an association of compensation information with the at least the portion of the word, output of audio associated with the at least the portion of the word.

18. The system of claim 17, wherein the compensation information comprises an indication to perform one or more of: processing the audio, applying a filter, applying a frequency translation, replacing at least the portion of the word, modifying at least the portion of the word, replacing a sound, modifying a sound, or displaying a notification.

19. The system of claim 17, wherein the compensation information comprises one or more of: an input parameter of a process to generate the audio, an input parameter of a process to modify the audio, an amount of frequency translation to apply to generate audio, a time to apply frequency translation to generate the audio, or a location to apply frequency translation to generate the audio.

20. The system of claim 17, wherein the computing device is configured to cause the output of the audio by one or more of: generating at least a portion of the audio based on the compensation information, selecting at least a portion of the audio based on the compensation information, or modifying at least a portion the audio based on the compensation information.

21. The system of claim 17, wherein the computing device is configured to determine at least the portion of the word by determining that the closed caption data comprises a set of characters associated with the hearing impairment.

22. The system of claim 17, wherein the computing device is configured to determine at least the portion of the word by determining, based on analyzing characters in the closed caption data, one or more characters, syllables, or words associated with the hearing impairment.

23. The system of claim 17, wherein the computing device is configured to determine the closed caption data associated with the content asset by accessing the closed caption data in one or more of: a closed caption file, a closed caption stream, a closed caption database, a segment of a transport stream, a content frame, or a field of content data.

24. The system of claim 17, wherein the computing device is further configured to:
  determine an estimated time associated with the audio that correlates to at least the portion of the word; and
  apply, based on the estimated time associated with the audio, a corrective action associated with the content asset to one or more of modify, select, or generate the audio.

* * * * *